(No Model.)
A. McLEAN.
BRICK MOLD.
No. 399,064. Patented Mar. 5, 1889.
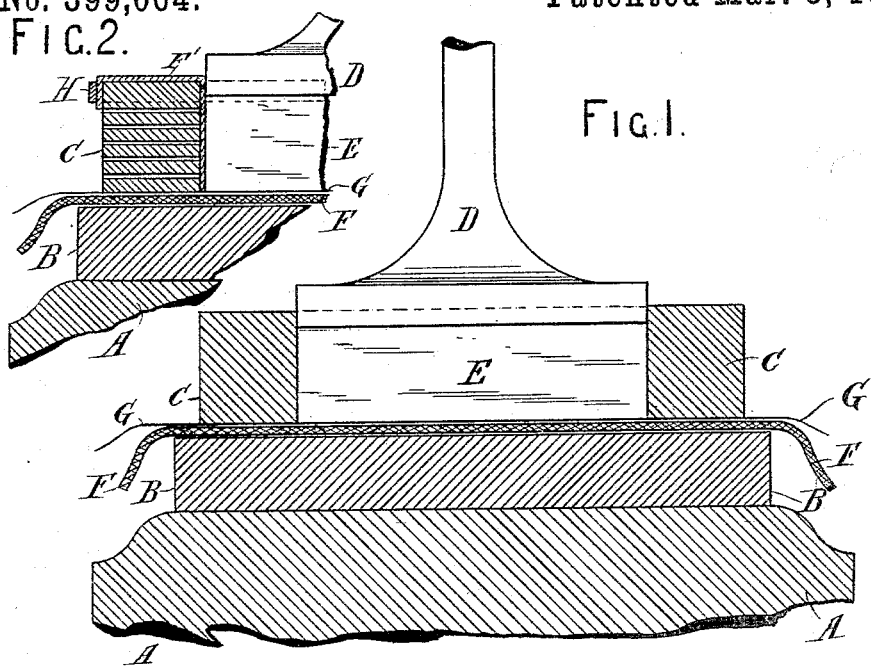
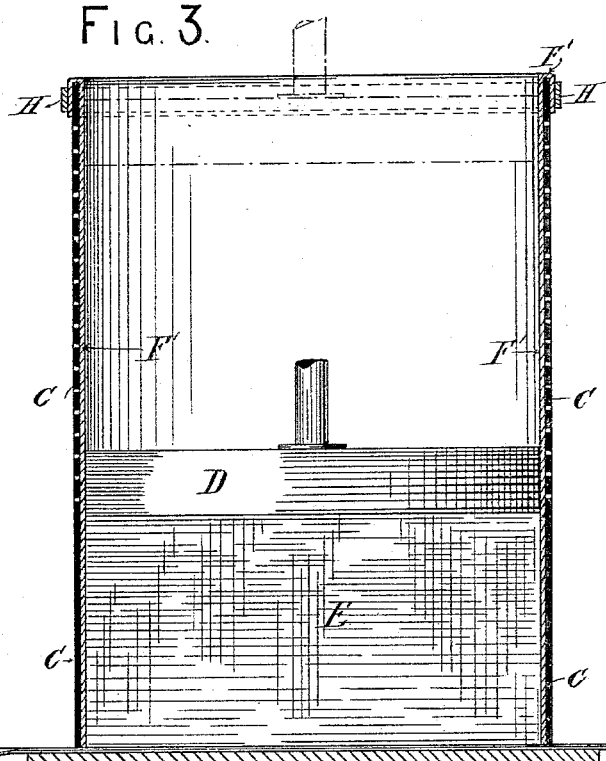
Witnesses:
C. Sundgren,
Emil Foerter.
Inventor:
Alexander McLean
by attorneys
Brown & Hall

UNITED STATES PATENT OFFICE.

ALEXANDER McLEAN, OF RESERVOIR ROAD, BROCKLEY, COUNTY OF SURREY, ASSIGNOR OF ONE-HALF TO ROBERT COMYNS EAMES, OF LONDON, ENGLAND.

BRICK-MOLD.

SPECIFICATION forming part of Letters Patent No. 399,064, dated March 5, 1889.

Application filed February 17, 1887. Serial No. 227,960. (No model.) Patented in England June 9, 1884, Nos. 8,747 and 8,748.

*To all whom it may concern:*

Be it known that I, ALEXANDER MCLEAN, of 20 Reservoir Road, Brockley, in the county of Surrey, cement-manufacturer, have invented a new and useful improvement in apparatus for the manufacture of slabs, blocks, bricks, and similar articles, and for the separation of liquid from solid substances, of which the following is a specification.

This invention relates to the manufacture of decorative slabs or panels from Keene's, Parian, or similar cements, of paving slabs or blocks from Portland cement or other concrete, and of bricks and tiles from plastic materials by the aid of pressure; and the invention also relates to expressing water from the "slip" used in the pottery manufacture, from china-clay after it has been washed, or in the manufacture of whiting, for drying peat in blocks for fuel, and for other purposes where it is desired to get rid of an excess of moisture.

It is well known that a proportion of water is required to produce on cements the effect called "setting," and also to render clay sufficiently plastic for use in the manufacture of bricks and tiles. It is also well known that pressure improves the quality of the slabs, blocks, bricks, or tiles made from the above-mentioned materials, as it tends to prevent the formation of blow-holes, but in order to take advantage of the pressing, the cement and clay have to be mixed with hardly enough water to insure the proper setting of the cement or the proper and easy working of the clay. Even under these conditions but comparatively slight pressure can be given for the reason that it has been hitherto impossible to make proper or adequate provision to get rid of superfluous moisture without (owing to the incompressibility of the water) squeezing the material out of the molds if too great pressure is applied.

Now the object of this invention is to provide for the manufacture of slabs, blocks, and other articles by the aid of pressure from materials which are comparatively wet—that is to say, that have been mixed with such a quantity of water as to insure the proper and best results—and also to express the water from materials (for the purpose of drying the same) which have been treated with an excess of water—such, for example, as in the preparation of china-clay for the market, in the manufacture of whiting, and generally to separate liquid and solid substances for any purpose for which such separation may be desired.

The simplest and the best mode of putting this invention into practice is to provide a firm base-plate, upon which I place a sheet of felt or analogous hair fabric of larger dimensions than the base-plate, and upon the felt I secure in any convenient manner a rectangular or other shaped frame of the proper height and size, and of suitable strength, which will form the mold proper.

Figure 1 in the accompanying drawings represents a sectional elevation of a mold for making blocks or bricks according to this invention. Fig. 2 is a similar view of part of a mold, showing a modification of the invention. Fig. 3 is a vertical sectional view of a mold for the compression into blocks of the solid matter contained in sewage.

Similar letters of reference indicate corresponding parts in the several figures.

A is a foundation of any suitable solid material.

B is a base-plate forming the bottom of the mold.

C is the mold or receptacle.

D is a plunger of a hydraulic or other press, and E is the material under pressure.

F is a sheet of felt, which is laid upon the base-plate B, and G is a piece of canvas placed between the mold C and the felt F, for the purpose hereinafter set forth.

In Figs. 2 and 3 I have shown a perforated mold or receptacle lined with felt F' around its sides in addition to the felt F at the bottom of the mold. This felt lining may be secured in any convenient manner; but I have shown it lapped over the edge of the mold and secured by a ring, H.

The mold or receptacle C, Fig. 3, which is cylindrical, is shown as perforated for a portion only of its depth; but it may be perforated the whole of its depth, if desired.

The mold thus arranged will be filled with the material, and the pressure will be applied by a hydraulic or other press, or in any other convenient manner. The effect of the pressure (which may be of many tons) will be to force the water out of the material and produce a solid homogeneous slab or block having a smooth surface and free from blowholes.

The sheet of canvas or other coarse fabric, G, laid over the felt in the mold prevents the fibers of the felt from becoming incorporated with the slabs or blocks. This sheet will readily peel off the slab or block when the latter has been completed.

It will be seen that the absorbent material and the coarse fabric G extend beyond the side edges of the mold or receptacle C.

In this way the manufacture of slabs, &c., may be proceeded with at considerable speed, and the slabs, &c., will be sufficiently dry to be handled almost immediately without inconvenience, and thereby much of the time now required for setting or drying in the ordinary processes of making slabs, &c., will be saved.

In the manufacture of decorative slabs a plate of metal engraved, cut, or cast with any suitable design or pattern, in relief or intaglio, will be secured to the under face of the plunger of the press by which the pressure is applied.

In some cases I may perforate the sides and bottom of the molds to allow the exuding water to flow away more freely.

In expressing the water from slip in the drying of china-clay and in the manufacture of whiting these materials will be formed into blocks in a similar manner, and the employment of heat as hitherto to dry the materials will be rendered to a great extent, if not entirely, unnecessary—an advantage which china-clay merchants at least will greatly appreciate.

In drying peat the material will be compressed into blocks of suitable size by any suitable means.

The invention may also be used in the treatment of sewage, the sewage being run into suitable tanks or receivers lined with felt or similar material, and on pressure being applied thereto the liquid will be forced out in a filtered condition, the solid matters remaining in the tank to be treated in any manner that may be desired.

I claim—

In a mold for bricks and similarly-shaped articles, the combination of a base-plate forming the bottom of the mold, a receptacle forming the sides of the mold and supported by said base-plate, a layer of felt or similar absorbent material placed on the said base-plate between it and the said receptacle, and a layer of coarse fabric upon the top of the said absorbent material, both said absorbent material and the layer of coarse fabric extending beyond the side edges of the receptacle, and a plunger, substantially as specified.

ALEXR. McLEAN.

Witnesses:
ARTHUR R. SKERTEN,
G. W. WESTLEY,
*Both of 17 Gracechurch Street, London, E. C.*